(12) United States Patent
Dhawan

(10) Patent No.: US 7,577,591 B2
(45) Date of Patent: Aug. 18, 2009

(54) SYSTEM AND METHOD FOR GENERATING A PRODUCT ORDER FROM A PRODUCT SAMPLE

(75) Inventor: Puneet Dhawan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/625,486

(22) Filed: Jan. 22, 2007

(65) Prior Publication Data

US 2008/0177788 A1 Jul. 24, 2008

(51) Int. Cl.
G06F 17/30 (2006.01)
G06Q 30/00 (2006.01)

(52) U.S. Cl. .......................................... 705/26; 705/27
(58) Field of Classification Search ............... 705/26–27
See application file for complete search history.

(56) References Cited

U.S. PATENT DOCUMENTS

| | | | | |
|---|---|---|---|---|
| 5,305,199 | A | 4/1994 | LoBiondo et al. | 364/403 |
| 5,815,657 | A | 9/1998 | Williams et al. | 395/186 |
| 5,960,411 | A | 9/1999 | Hartman et al. | 705/26 |
| 6,167,383 | A * | 12/2000 | Henson | 705/26 |
| 6,170,065 | B1 | 1/2001 | Kobata et al. | 714/7 |
| 6,182,275 | B1 | 1/2001 | Beelitz et al. | 717/1 |
| 6,295,423 | B1 | 9/2001 | Haines et al. | 399/24 |
| 6,356,874 | B1 | 3/2002 | Øhrn | 705/6 |
| 6,418,555 | B2 | 7/2002 | Mohammed | 717/169 |
| 6,431,704 | B1 | 8/2002 | Silverbrook | 347/104 |
| 6,598,223 | B1 | 7/2003 | Vrhel, Jr. et al. | 717/174 |
| 6,714,937 | B1 | 3/2004 | Eynon et al. | 707/102 |
| 6,928,644 | B1 * | 8/2005 | Kroening et al. | 717/175 |
| 2002/0073148 | A1 | 6/2002 | Haines et al. | 709/204 |
| 2002/0091456 | A1 | 7/2002 | O'Connor | 700/97 |
| 2002/0108439 | A1 | 8/2002 | Whitehead | 73/290 |
| 2002/0118243 | A1 | 8/2002 | Forman | 347/19 |
| 2002/0178075 | A1 * | 11/2002 | Emerick et al. | 705/26 |
| 2004/0111326 | A1 | 6/2004 | Rock, Jr. et al. | 705/26 |
| 2004/0163011 | A1 * | 8/2004 | Shaw | 714/25 |
| 2007/0136775 | A1 * | 6/2007 | MacKay et al. | 725/106 |

OTHER PUBLICATIONS

"Hawaii tech firm, Dell form partnership; Axean Pacific will be able to push the PC maker's products while selling its own network services". Tim Ruel. Honolulu Star—Bulletin. Honolulu, Hawaii: Oct. 11, 2000. [recovered from Proquest database on Oct. 17, 2008].*
"Dell planning kiosks in 20 cities". Peter J. Brennan. Chicago Sun—Times. Chicago, Ill.: Jul. 6, 2002, p. 28. [recovered from Proquest Database Feb. 28, 2007].*

* cited by examiner

Primary Examiner—Jeffrey A. Smith
Assistant Examiner—William J. Allen
(74) Attorney, Agent, or Firm—Hamilton & Terrile, LLP; Robert W. Holland

(57) ABSTRACT

A product order is automatically generated from a product sample by an indication made at the product sample. For example, configuration information of an information handling system is communicated through a network to an order engine that applies the configuration information to generate an order for a similarly-configured information handling system. The order is communicated from the order engine for presentation at the information handling system to allow alterations to the order configuration, purchase of an information handling system with the order or storage of the order for subsequent alteration or purchase.

11 Claims, 3 Drawing Sheets

SYSTEM AND METHOD FOR GENERATING A PRODUCT ORDER FROM A PRODUCT SAMPLE

BACKGROUND OF THE INVENTION

1. Field of the Invention

The present invention relates in general to the field of placing orders for products, such as information handling systems, and more particularly to a system and method for generating a product order from a product sample.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

End users have tremendous flexibility in selecting the capability and price of an information handling system by selecting the components used to build their system. Build-to-order Web sites, such as Dell.com, allow an end user to configure an information handling system with desired hardware and software components. The system is built from the end user's ordered configuration and shipped to the end user in a matter of days or weeks. Many end users prefer to order information handling systems configured to their specification because they are assured of ordered capabilities without having to pay for other unneeded components that are sometimes included in systems that are mass produced for sale in retail stores. However, some end users prefer to touch and feel an information handling system before purchasing the system, particularly in the case of novice end users who may not have a very comprehensive understanding of the components included in information handling systems. For example, the end user may want to try CPUs having varying speeds and systems having varying amounts of memory to see if the extra performance offered by a more powerful CPU or extra memory is worth the extra cost. As another example, the end user may want to lift and try out portable information handling systems to see if the weight, size and balance provide an acceptable solution.

One way that end users try out information handling systems is by use of an existing system at work or at a friend's residence. If an end user finds an existing information handling system at work or a friend's to meet the end user's needs, the end user can purchase a system using the configuration of the existing system as a guide. The end user can obtain the existing information handling system's configuration from its purchase order, by word of mouth or by investigating the configuration as identified by the operating system. Once the end user has an information handling system configuration, the end user can place an order for the exact system or with desired modifications through a build-to-order Web site. Another alternative is for an end user to go to an electronics retailer to try out various models of information handling systems set up as displays. If the end user finds an information handling system with desirable features, the end user can note the desirable features to use in a subsequent build-to-order purchase. However, an end user often finds it inconvenient to locate and record the configuration of the information handling system. Further, if the end user makes a mistake in recording the desired configuration, the mistake may not become evident until after the end user has purchased an incorrectly configured system.

SUMMARY OF THE INVENTION

Therefore a need has arisen for a system and method which allows an end user of a product to automatically order a similarly configured product.

In accordance with the present invention, a system and method are provided which substantially reduce the disadvantages and problems associated with previous methods and systems for determining build-to-order product orders. Configuration information associated with a product sample is communicated to a network location and applied to generate an order for a product having a configuration related to the product sample. For example, components used to build an information handling system sample are identified to define an order for an information handling system having the same or related components.

More specifically, an order module running on an information handling system gathers configuration information associated with the information handling system and communicates the configuration information through a network to an order engine at a network location. In one embodiment, the configuration information is a list of hardware and software components maintained by the operating system of the information handling system. In an alternative embodiment, the configuration information is an identifier unique to the information handling system that allows the order engine to look up hardware and software components used to build the information handling system. The order engine applies the configuration information to generate an order for an information handling system having the same or related components and communicates the order for presentation at the information handling system. An end user associated with the information handling system can place the order as generated by the order engine, make alterations to the order by changing components or save the order at a network location, such as through a shopping cart, for subsequent purchase.

The present invention provides a number of important technical advantages. One example of an important technical advantage is that an end user of an information handling system can automatically place an order for a similarly-configured information handling system. Activation of an icon or other purchase indication at an information handling system automatically determines the configuration of the information handling system and prepares an order for a similarly-configured system through a build-to-order network site. The end user is provided with a clear description of the existing information handling system, the components proposed for a similarly-configured information handling system order and the option to modify the proposed order. Once the end user determines a desired configuration, the end user may place the order or save the order at the network site for subsequent consideration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Automatic generation of an order for an information handling system based upon configuration information gathered for a sample information handling system simplifies purchase of sample system by an end user from a build-to-order manufacturer. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
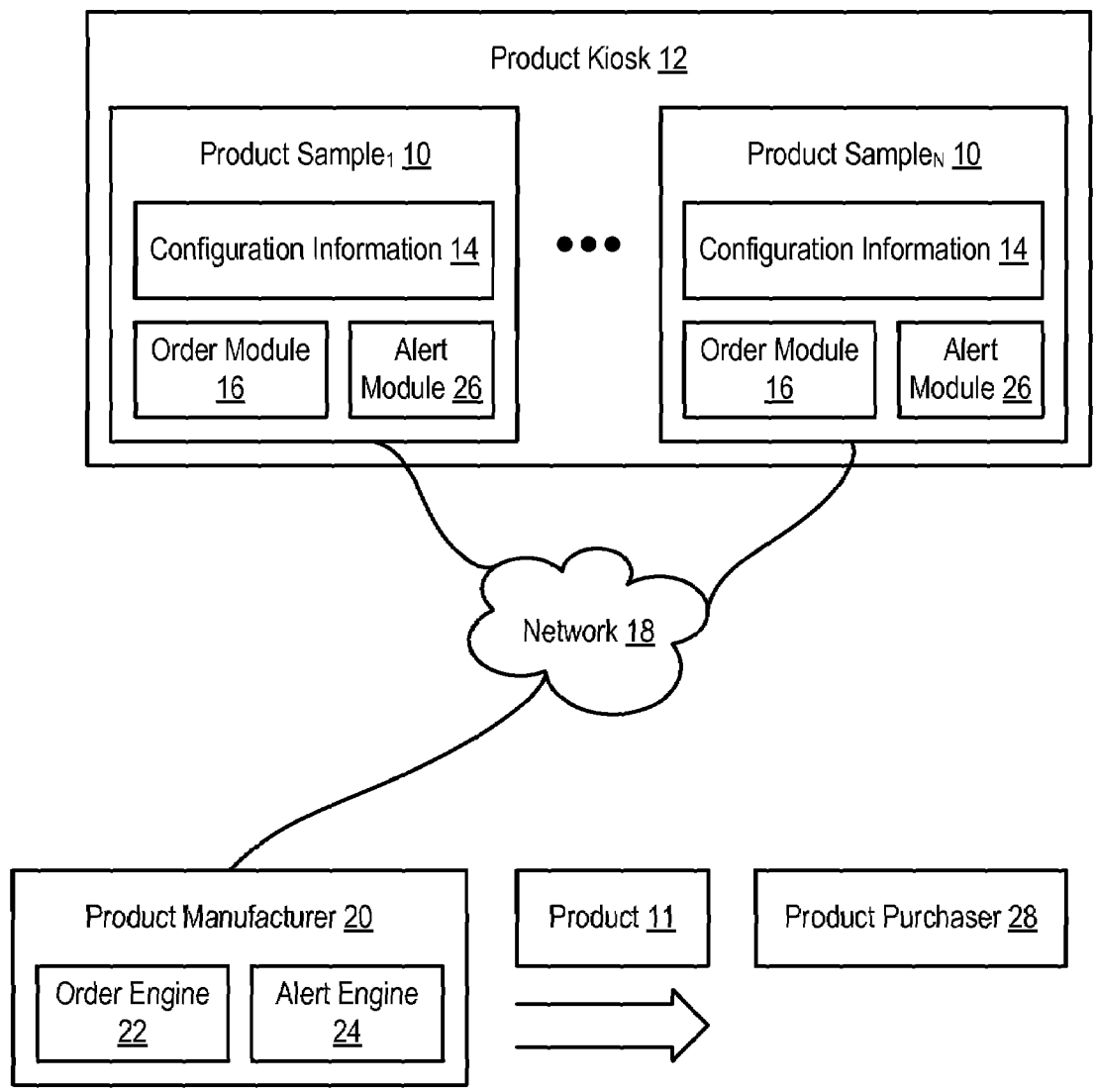
FIG. 1 depicts a block diagram of a system for placing a product order for a product based on a product sample.

Referring now to FIG. 1, a block diagram depicts a system for placing a product order for a product based on a product sample 10. Product samples 10 are available for manipulation by end users at a product kiosk 12, such as a display of plural product samples 10 in a retail store. Each product sample 10 is built with a configuration of components, such as hardware and software components, that are reflected by configuration information 14 stored on the respective product 11. End users are free to try various product samples 10 at kiosk 12 to decide if a particular product sample 10 is desirable for purchase. Once an end user has an interest in purchase of a product based on the end user's experience with a product sample 10, the end user initiates purchase by activation of an order module 16 running on the selected product sample 10. Order module 16 gathers configuration information 14 and communicates the configuration information through a network 18 to a product manufacturer 20. An order engine 22 associated with the product manufacturer applies the configuration information to generate an order for a product based upon the product sample and communicates the order to order module 16 for presentation to the end user. By generating an order from the configuration information, order engine 22 provides the end user with an order for a product configured substantially similarly to the selected product sample without requiring the end user to read, copy, track or even understand configuration information 14. An alert engine 24 determines alerts associated with the generated product order, such as differences from the product sample or delays for orders to be fulfilled, and communicates the alert to alert module 26 at the product sample for presentation to the end user. Order module 16 accepts alterations to the order by the end user and communicates an end user's decision to purchase a product from an order to product manufacturer 20. The product is built to the order configuration and then shipped to the product purchaser 28.

Figure 2:
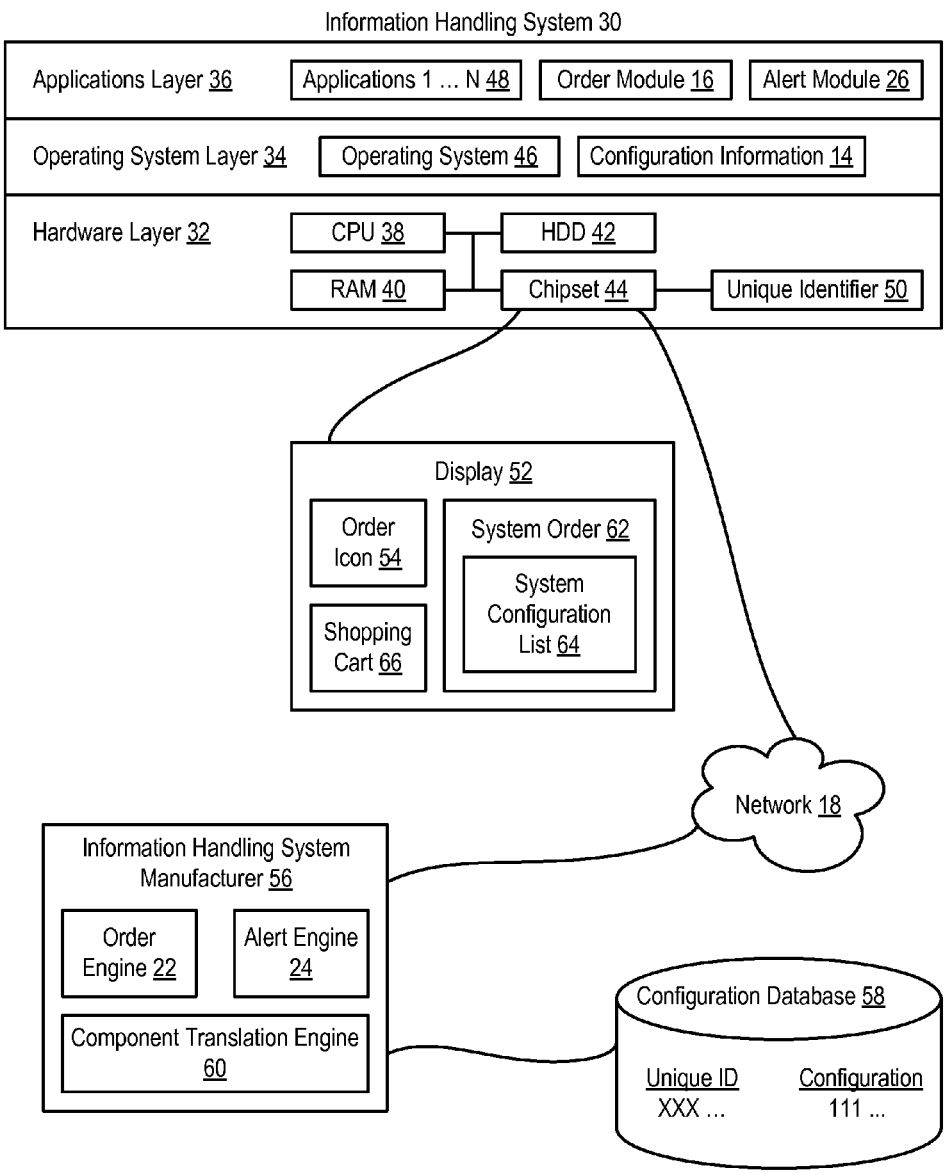
FIG. 2 depicts a block diagram of a system for placing an information handling system order based on a sample information handling system configuration.

Referring now to FIG. 2, a block diagram depicts a system for placing an information handling system order based on a sample information handling system configuration. The product sample available for inspection to a potential purchaser is an information handling system 30 having a hardware layer 32, an operating system layer 34 and an application layer 36. Hardware layer 32 includes plural processing components that coordinate to process information, such as a CPU 38, RAM 40, a hard disk drive 42 and a chipset 44. Operation of the processing components is coordinated with an operating system 46 in operating system layer 34, which supports the running of applications 48 in application layer 36. Operating system 46, such as WINDOWS, maintains configuration information 14 which lists the hardware and software components loaded on information handling system 30. For example, operating system 46 queries the hardware components to discover the manufacturer, model and capability of each component, such as the operating speed of CPU 38 and storage size of RAM 40 and hard disk drive 42. Similarly, operating system 46 manages installation of applications 48 and maintains a list of the application names and versions. The lists of hardware and software components are typically available for review by an end user through operating system 46. Other types of configuration information are also maintained on information handling system 30, such as a unique identifier 50 stored in flash memory of chipset 44 and available through a BIOS that runs on chipset 44. Unique identifier 50 uniquely identifies information handling system 30 for maintenance and warranty purposes and is typically accessed for the manufacturer to authorize service to information handling system 30.

An end user views the information processed by information handling system 30 through a display 52, such as an LCD integrated into information handling system 30 or connected by an external cable. If the end user has an interest in purchasing a system similar to the system currently in use, the end user initiates the generation of an order by activating an order icon 54, which initiates operation of order module 16. One advantage of order module 16 is that an end user can generate an order to purchase an information handling system 30 based on virtually any sample system by retrieving order module 16 through network 18 and running order module 16 on the desired sample. Thus, for example, the sample system might be a sample running in a kiosk at a retail store or a system purchased by a friend of the end user and running at the friend's home. Once order icon 54 initiates order module 16, order module 16 gathers configuration information 14 and communicates configuration information 14 through network 18 to an information handling system manufacturer location 56. In one embodiment, configuration information 14 is a list of the hardware and software components loaded on the system as maintained by operating system 46. In an alternative embodiment, where the manufacturer has access to unique identifier information, configuration information 14 may be limited to unique identifier 50 so that the manufacturer can look up the hardware and software components originally used to build information handling system 30 from a configuration database 58. In either embodiment, the hardware and software components used to build the sample information handling system 30 are provided to order engine 22 running at a network location associated with manufacturer 56.

Order engine 22 applies the configuration information of sample information handling system 30 to generate an order for manufacture of an identical or substantially similar information handling system 30. In the event that all of the hardware and software components associated with the sample are available to build a new system, order engine 22 locates manufacture codes for the components, such as SKU codes, and organizes the components and codes in an order form that the end user can submit to order manufacture of the system. Where, for instance, unique identifier 50 has an order form saved in configuration database 58, that order form can be used as the basis for the generated order form. In the event that the sample information handling system 30 has components not available to the manufacturer, such as where components are outdated or the sample was built by a different manufacturer, a component translation engine 60 analyzes the unavailable components to suggest alternative components, such as the upgraded version of the outdated component. Alert engine 24 analyzes the generated order for differences from sample information handling system 30 and generates alters that explain the differences to the end user. Alert engine 24 also analyzes the components of the generated order to identify potential difficulties, such as delays in obtaining components that might delay manufacture of the generated order. Order engine 22 communicates the generated order to order module 16 for presentation as a system order 62 at display 52. System order 62 provides a system configuration list 64 in an order form so that an end user can make alterations to the order. Alert engine 24 provides the alerts to alert module 26 so that the end user has the alert information to decide whether to purchase a system based on the order. Once the end user has decided to purchase a system, the end user activates the shopping cart 66 and places system order 62 with manufacturer 56. The end user can approve the purchase or save the shopping cart at a manufacturer network location to initiate the purchase at a subsequent time.

Figure 3:
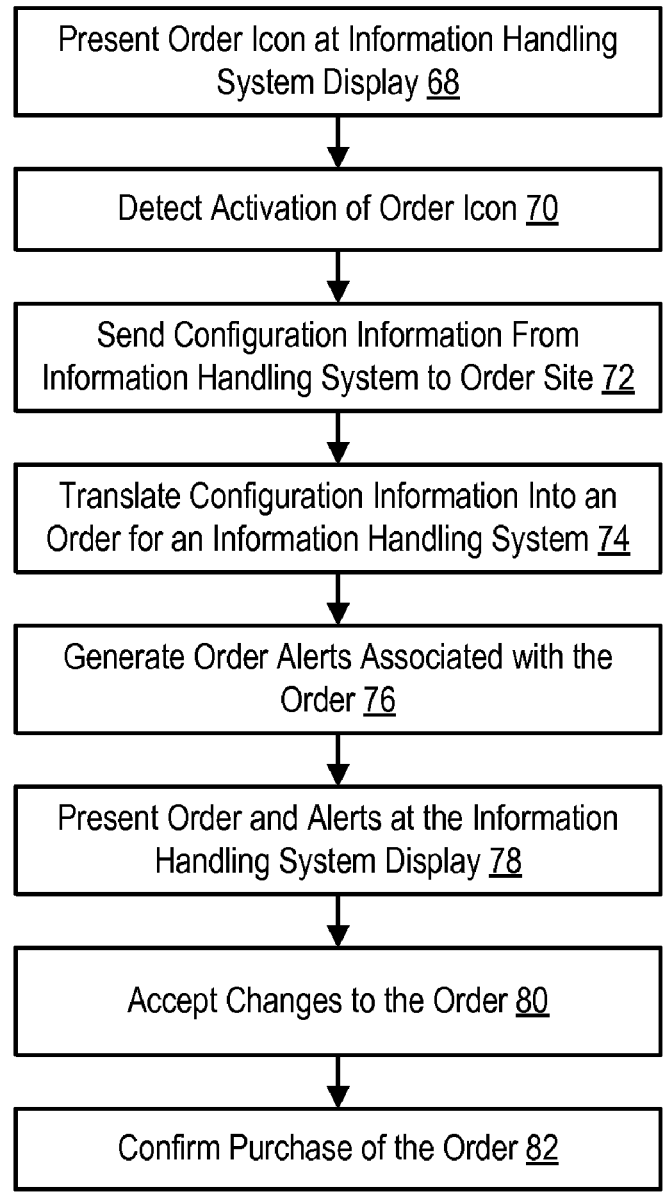
FIG. 3 depicts a flow diagram of a process for placing an information handling system order based on a sample information handling system configuration.

Referring now to FIG. 3, a flow diagram depicts a process for placing an information handling system order based on a sample information handling system configuration. The process begins at step 68 with the presentation of an order icon at a sample information handling system display to support orders for systems based upon the configuration of the sample information handling system. At step 70, end user activation of the order icon is detected at the sample information handling system. At step 72, configuration information for the sample information handling system is gathered at the sample information handling system and sent through a network, such as the Internet, to an order site associated with an information handling system manufacturer network location. At step 74, the configuration information is translated into an order that allows purchase of a similarly configured information handling system built to order by the manufacturer. At step 76, order alerts associated with the order are generated, such as differences between the sample and order configurations of hardware and software components or delays expected in the filling of the order. At step 78, the order and alerts are presented at the sample information handling system display. At step 80, changes to the order, such as alterations to the hardware and software components, are accepted at the sample information handling system. At step 82, purchase of an information handling system based on the order is confirmed and the order is forwarded to a manufacturing facility to proceed with the build of the information handling system.

Although the present invention has been described in detail, it should be understood that various changes, substitutions and alterations can be made hereto without departing from the spirit and scope of the invention as defined by the appended claims.

What is claimed is:

1. A method for generating a product order from a product sample, the product sample having a configuration of components, the method comprising:
   initiating the product order at an operating product sample;
   retrieving configuration information from the product sample, the configuration information identifying the configuration of components;
   communicating the configuration information from the product sample through a network to a network location;
   applying the configuration information at the network location to generate a product order for a product having the product sample configuration of components;
   determining an alert associated with the generated product order;
   wherein the alert is provided in response to differences between components of the product sample configuration and a configuration of the generated product order.

2. The method of claim 1 wherein the product sample comprises an information handling system and the components comprise a CPU.

3. The method of claim 2 wherein the product order configuration of components comprises a CPU related to the product sample CPU.

4. The method of claim 1 further comprising:
   presenting the product order at the product sample;
   receiving alterations to the product order at the product sample; and
   communicating the alterations to the network location to generate a product order having the alterations.

5. The method of claim 1 wherein the alert comprises a delay associated with the product order.

6. The method of claim 1 wherein the configuration information comprises a unique identifier associated with the product sample, the method further comprising:
   retrieving a configuration of components associated with the unique identifier at the network location; and
   applying the retrieved configuration of components to generate the product order.

7. The method of claim 1 further comprising:
   storing the product order at the network location, the product order associated with an end user;
   retrieving the product order with an information handling system through a network by reference to the end user; and
   placing the product order for purchase of the product by the end user.

8. A system for generating a product order from a product sample, the system comprising:
   a processing device associated with the product sample and having instructions for:
   an order module operable to run on the product sample processing device to determine configuration information associated with the product sample and to communicate the configuration information through a network;

an order engine running at a network location, the order engine operable to interface with the order module to receive the configuration information and to apply the configuration information to generate an order for a product having the configuration of the product sample;

an alert engine operable to determine an alert regarding the generated product order, wherein the alert engine is operable to determine an alert in response to differences between components of the product sample configuration and a configuration of the generated product order.

9. The system of claim 8 wherein the product sample comprises an information handling system and the configuration information comprises components used to build the information handling system.

10. The system of claim 8 wherein the product sample comprises an information handling system and the configuration information comprises a unique identifier of the information handling system, and wherein the order engine is farther operable to apply the unique identifier to determine components used to build the information handling system to generate an order for an information handling system having related components.

11. The system of claim 8 wherein the product sample comprises an information handling system.

* * * * *